United States Patent

Sugiyama et al.

[11] 3,932,228
[45] Jan. 13, 1976

[54] METAL MATERIAL FOR SLIDING SURFACES

[75] Inventors: Masashi Sugiyama; Takumi Kunikiyo, both of Hamamatsu, Japan

[73] Assignee: Suzuki Jidosha Kogyo Kabushiki Kaisha, Japan

[22] Filed: Oct. 29, 1974

[21] Appl. No.: 518,508

[30] Foreign Application Priority Data
Nov. 1, 1973 Japan................................ 48-123205

[52] U.S. Cl.................. 204/26; 204/16; 123/193 C
[51] Int. Cl.².......................... C25D 7/04; C25D 5/02
[58] Field of Search................ 204/16, 35 R, 25, 26; 277/235; 123/193 C

[56] References Cited
UNITED STATES PATENTS

| | | |
|---|---|---|
| 2,314,604 | 3/1943 | van der Horst........................ 204/26 |
| 2,412,698 | 12/1946 | van der Horst........................ 204/26 |
| 3,061,525 | 10/1962 | Grazen.................................... 204/9 |

*Primary Examiner*—T. M. Tufariello
*Attorney, Agent, or Firm*—Joseph P. Gastel

[57] ABSTRACT

In a metal material having a surface adapted to slide on a surface having a nickel-silicon carbide composite electroplated layer and subjected to a treatment for causing silicon carbide particles to project outward beyond the surface, the surface of the metal material is provided with porous hard chrome plating, whereby a lubricant may be deposited and retained in the porous plated layer.

4 Claims, 3 Drawing Figures

METAL MATERIAL FOR SLIDING SURFACES

BACKGROUND OF THE INVENTION

This invention relates to a metal material for sliding surfaces to be used in combination with a composite plated sliding surface beyond which coprecipitates project outward.

As a material adapted to slide on a composite plated layer, there has heretofore been used a cast iron consisting of flaky, massive or globular graphite uniformly distributed in a pearlite matrix. Metal materials subjected to a surface treatment, that is, hard chrome plating, metal molybdenum spraying, bronze plating, and the like have also been used. Although the modulus of elasticity, transverse rupture strength, hardness, impact resistance and fatique limit of these metal materials depend on the base materials, there has been a problem from a practical standpoint in that, no matter which material is used, a large amount of wear to both or either one of the composite plated layer and the metal material results. In addition, some of these metal materials have the drawback of damaging the composite plated layer or adhering thereto by fusion seizure. For this reason, in order to utilize composite plated layers, there has been an urgent demand for developing metal materials without any such problems as are mentioned above.

There have been proposed prior arts relating to composite electroplating as typically disclosed, for instance, by a Japanese Pat. No. 280,939. According to this patent, there is disclosed a method wherein there is electrolytically coprecipitated a composite film consisting of any one of metals such as nickel, chromium, copper, cadmium, and optionally selected powdered substances such as alminum oxide, iron oxide, silicon carbide, tungsten carbide, diamond, etc. on the surface of a metal matrix, thereby providing the metal surface with extraordinary resistance against wear, heat, corrosion, etc.. Among these substance applied in such composite electrolytic operation, it has been most common for those skilled in the art to use nickel as a metallic component plus silicon carbide as a powdered admixture.

In this typical application, taken by way of example from among other known arts, wherein a composite film is electroplated, an electrolytic bath containing nickel sulfamate, nickel chloride, boric acid and other effective admixtures is first prepared in an electrolytic cell, thereafter powdered silicon carbide is further dispersed evenly to be suspended therein. In this particular electrolytic bath, it is essential to use caution to keep the powdered substance admixed from settling in the bath. Electrolytic nickel is used as anode and a metallic material to be coated is used as cathode. With such arrangement, electrolytic operation is performed by passing a current through the electrolytic cell and then coprecipitated on the surface of said material is powdered silicon carbide to be evently dispersed in the electroplated layer of nickel. The silicon carbide which is a coprecipitate has an average particle diameter of about 4 $\mu$. The silicon carbide content in the composite plated layer is about 6% by weight. The silicon carbide which is a coprecipitate in the composite plating is a hard substance having a knoop hardness of 2480, whereby the hardness of the composite plated layer is enhanced and the wear resistance thereof is improved by coprecipitation of silicon carbide. For the sliding surfaces of machine tools, the inner wall surfaces of cylinders of internal combustion engines, clutch plates, and like parts, a hard metal or a hard metal which has been subjected to a surface treatment is used since the metal wears out through the sliding on, colliding with or being passed by another substance.

There are two types of wear, namely, initial wear that occurs before the two sliding materials are mutually run in, and stationary wear that occurs thereafter. Maximum quantity of wear occurs at a part where the direction of movement is reversed or a lubricating oil film is interrupted. A satisfactory material having high wear resistance means a material having excellent oil film retentivity. This is why cast iron is frequently used as a wear resisting material. More particularly, although cast iron shows slightly different physical properties depending on the form and quantity of graphite precipitated in the structure, cast iron is capable of storing oil to prevent the interruption of oil supply while it serves as a solid lubricant, and recesses from which the graphite have been removed act as oil sumps which held the formation and retention of lubricating oil films on the sliding surfaces. Further, cast iron effectively dissipates frictional heat due to its high thermal conductivity and readily adaptes to fit the form of the other material due to the low modulus of elasticity.

In order to improve the wear resistance of a composite plated layer, it is important to enhance the oil film retentivity as in the case of cast iron. In nickel-silicon carbide composite plating, phosphorus compounds are added in the plating bath to increase the hardness of the plated layer, thereby preventing silicon carbide from being forced into the nickel matrix by striking action or sliding pressure, while, at the same time, the plated layer is electropolished by connecting the plated layer as the anode, thereby causing silicon carbide particles to project beyond the composite plated surface. These particles form the first sliding surface and the recessed surface of the nickel matrix form the second sliding surface with oil being retained between the first and second surfaces, whereby the lubricating performance of the sliding surfaces is improved. The composite plated layer obtained by adding phosphorus compounds to increase the hardness and electropolishing said layer to cause silicon carbide grains to project beyond the surface by from 1 to 2 $\mu$(hereinafter referred to as a composite electroplated layer) has higher wear resistance than that of an ordinary composite plated layer.

When this composite electroplated layer is applied to the inner wall surface of a cylinder of an internal combustion engine, the piston rings to slide therealong must have a high wear resistance which is similar to the composite electroplated layer. Since the mechanism of wear and lubrication of a piston-ring material is similar to that of a cylinder material, the composite electroplated layer is also applied to the piston-ring material thereby to improve its wear resistance. As a piston-ring material, pearlitic cast iron containing a large quantity of phosphorus and hard steadite distributed therein with globular graphite uniformly distributed is excellent in wear resistance, thermal resistance, and strength.

When a composite electroplated surface slides on a cast iron surface, the surface of the cast iron is scratched by the hard silicon carbide particles projecting outward beyond the composite electroplated surface, whereby wear is caused. Further, with respect to the cylinder, a lubricating oil film will be interrupted near the top dead center and the bottom dead center where the direction of movement changes, whereby wear will be caused also on the composite electroplated layer. Even cast iron cannot prevent wear, so that a metal material with higher hardness than that of cast iron provided with appropriate oil sumps or space becomes necessary.

The processes for surface treatment of piston rings include parkerizing, hard chrome plating, application of solid lubricants, molybdenum spraying, wet plating, and bronze plating applied on a chrome plated layer, but each of these treatment processes has advantages and disadvantages. Among these processes, hard chrome plating is commonly applied at present for improving durability. A hard chrome plated layer has various advantageous features such as high thermal conductivity, high corrosion resistance, and high melting point rendering the layer difficult to seize by function, and, furthermore, the wear coefficient thereof is sufficiently low. That is, the hardness of the layer is extremely high and the wear resistance thereof is substantially improved, so that the hard chrome plated layer, when applied to a piston ring, can greatly extend the life of the ring. However, the piston ring surface thus plated also has disadvantages. For example, it does not easily assume an intimately run-in state relative to the cylinder, and the cylinder wear becomes severe.

SUMMARY OF THE INVENTION

It is therefore an object of this invention to provide a metal material of high wear resistance adapted to slide on and along the inner surface of each cylinder of an internal combustion engine which inner surface has been subjected to nickel-silicon carbide composite plating.

Another object of this invention is to provide a metal material in which a very hard substance forms the first sliding surface, whereby direct contact between the metal of the invention and the other metal can be avoided thereby to produce high wear resistance.

Still another object of this invention is to provide a metal material with oil retaining space between the first and second sliding surfaces, whereby lubricating oil is constantly supplied to the sliding surfaces, thus preventing galling as well as wear due to abnormal abrasion.

A further object of this invention is to provide a metal material which can easily assume an intimately run-in state relative to a composite electroplated material.

According to this invention, briefly summarized, there is provided a metal material having a surface plated with porous hard chromium which is a metal material for sliding surfaces adapted to slide on a surface having a nickel-silicon carbide composite electroplated layer and subjected to a treatment for causing silicon carbide particles to project outward beyond the surface.

The nature, utility, and further features of the invention will be apparent from the following detailed description with respect to preferred embodiments of the invention when read in conjunction with the accompanying drawing briefly described below.

DETAILED DESCRIPTION

Figure 1:
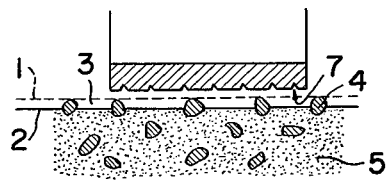
FIG. 1 is an enlarged sectional view showing two sliding surface portions wherein one is cast iron plated with porous hard chromium in accordance with this invention which is adapted to slide on the other surface having a composite electroplated layer.

Chrome plating is effected for decorative purpose owing to its beautiful luster and its high corrosion-resisting property on water or air, but it is also used on machine parts because of its great hardness and wear-resisting property. In the case of latter, it is often called "hard chrome plating".

The inventor found, however, that when the hard chrome plating is used, the plated surface has a poor oil retaining property because of its fineness, and causes burning on portions of surfaces sliding each other at a high speed and high pressure, but when the hard chrome plating is further worked, as will be described later into a porous hard chrome plating, the penetration of lubricant is improved and no burning is produced, thus porous hard chrome plating is favorable to be used on a surface of a material sliding on a composite plated surface.

The porous hard chrome plating can be obtained as follows:

First, the porous hard chrome plating is prepared in a bath having following conditions.

| Composition of bath: | |
| --- | --- |
| Chromic acid | 200 – 250 g/l |
| Sulfuric acid | 2 – 2.5 g/l |
| Temperature: | 50 – 60°C |
| Current Density | 40 – 100 A/dm² |

In plating a blank such as cast iron, the levelling and adherence are improved by first strike-plating at twice the electric current required above for 30–60 seconds, then returns to said required current density. Lead is used as the anode. This anode does not dissolve, but is consumed forming lead peroxide due to oxygen generated in the electrolysis. The lead peroxide has a good electrical conductivity, and the layer thereof formed on the surface protect the inner lead from chromic acid. When the surface layer becomes thick, the voltage required also increases, so that the anode is taken out and the layer is removed by lightly rubbing with a wire brush.

In order to increase the adherence of the chrome plating, the blank is often subjected to anode-treatment before plating. The liquid and the condition used commonly are:

| Chromic acid | 120 – 150 g/l |
| --- | --- |
| Sulfuric acid | 1 – 1.3 g/l |
| Temperature | 35 – 40°C |
| Current Density | 10 – 40 A/dm² |

When the blank material is of cast iron, this treatment is not effected because of its remarkable corrosion.

After the termination of plating, the article is washed throughly with warm water and dried. The drying is effected in a drying furnace at 150°-250°C for 30 min. to 2 hrs. to remove the hydrogen brittleness.

Two processes are known to form the porous hard chrome plating from the hard chrome plating thus obtained.

1. Electrolytic process

When a chrome plated surface is electrolysed with the surface as positive, partial holes or grooves are formed due to the facts that the stress distribution on the chrome plated film is not uniform, and that minute fissures or small holes found on the plated film become enlarged.

2. Process in which the blanks are preliminarily indented (or formed with cavities)

Forming preliminarily required holes or grooves on the blanks to be plated, the holes or grooves thus formed are kept maintained after plating. In this case, however, the penetration of lubricant is somewhat smaller as compared with the process (1) described above.

The electrolytic process shown above in (1) may be summarized as follows. The process up to the plating is the same as that stated above in hard chrome plating. The material after said plating is placed in said anode treating liquid, and electrolysis is proceeded, with the plating surface as positive electrode, at a temperature of 50°-60°C, a current density 40-100 A/dm² for 2-10 minutes.

An etched surface being obtained by this electrolysis, and this etched surface is machined to a required roughness. Care should be taken not to lose the etched grooves and holes due to too heavy a machining. It is preferable that ratio of occupation of porous portion relative to the total area after finishing operation is 18-54%.

Now, porous hard chrome plating is applied to the surface of a cast iron structure having physical properties and chemical composition as set forth in Table 1 below thereby to form a sliding surface. Next, the sliding surface plated with porous hard chrome is caused to slide on and along a sliding surface having a nickel-silicon carbide composite plated layer and subjected to a treatment such as electropolishing or mechanical polishing for causing silicon carbide particles to project outward beyond the surface as mentioned before.

Table 1

| Physical properties of cast iron | | |
|---|---|---|
| Standard modulus of elasticity (kg/mm²) | : | 17,000 |
| Standard transverse rupture strength (kg/mm²) | : | 100 min. |
| Hardness (HrB) | : | 100 - 110 |
| Decrease in tensile strength (%) | : | 7 max. |

| | Standard Chemical Composition (%) | | | |
|---|---|---|---|---|
| T.C | Si | Mn | P | S |
| 3.5 - 4.2 | 2.2 - 3.4 | 0.5 - 1.0 | 0.2 max. | 0.05 max. |

FIG. 1 shows enlarged sections of the aforementioned sliding surfaces wherein reference numeral 1 represents the first sliding surface, 2 the second sliding surface, 3 an oil spot, 4 a projecting silicon carbide particles, 5 a nickel matrix, and 7 designates a channel-type groove or a pinpoint opening on the surface of a porous hard chrome plated layer. Since the layer plated with porous hard chromium has such grooves or holes 7 and is very hard, the retentivity of a lubricating oil increases, and higher lubricating performance than that of a layer plated with hard chromium can be obtained with less oil consumption.

Accordingly, when a surface plated with such porous hard chromium is used to slide on a composite plated surface, the projecting hard silicon carbide particles 4 and the hard chrome plated surface slide on the first sliding surface 1 and, in addition, this sliding surface is constantly supplied with oil through the grooves or holes 7 on the hard chrome plated surface and the oil spaces 3 on the composite plated surface whereby both materials suffer very little wear, and hence the optimum combination of cylinder material and ring material can be obtained.

In order to indicate more fully the nature and utility of the invention the following specific examples of practice constituting preferred embodiments of the invention are set forth, it being understood that these examples are presented as illustrative only and that they are not intended to limit the scope of the invention.

EXAMPLE 1

Figure 2:
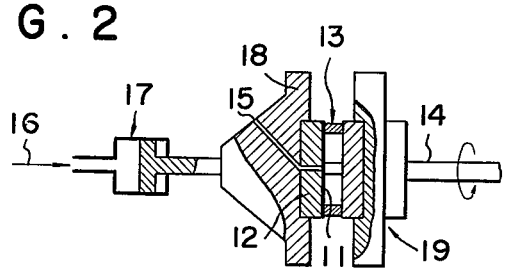
FIG. 2 is a diagrammatic side view showing the essential construction of a superhigh-pressure wear tester.

A wet-type wear test was carried out by means of superhighpressure wear tester, the essential mechanism of which diagrammatically in FIG. 2.

The test procedure comprised applying a load on a disc 12 of 80-mm diameter and 10-mm thickness having a composite electroplated layer 11 thereby to press this layer 11 against four stator ring members 13 measuring 5 × 5 mm and held by a jig 19 supported on and rotating with a rotating shaft 14, the load being applied by hydraulic pressure acting in the direction 16 against a piston operating in a hydraulic cylinder mechanism 17 and connected to a chuck 18 holding the disc 12. The stator ring members 13 are thereby caused to rotate in sliding contact with the composite electroplated layer 11 under the load. Lubricating oil is supplied through a passageway 15 in the chuck 18. Further, the conditions under which the wear test was carried out were as shown in Table 2. The degrees of wear of the ring members of cast iron and those of cast iron plated with porous hard chromium were compared.

Table 2

| Friction method | Mobile SAE 20 lubricating oil. Oil temperature 60°C, 600 cc/min |
|---|---|
| Friction velocity (m/sec) | 3, 4, 5 |
| Contact load (kg/cm²) | 70 |
| Friction distance (km) | 100 |

In this test, channel-type porous hard chromium having a porosity of 30 ± 10 (% by area) was used for plating. The finishing roughness of the composite electroplated layer before sliding was of from 0.6 to 1.5 μ measured by the height of SiC projected on the metal surface.

Figure 3:
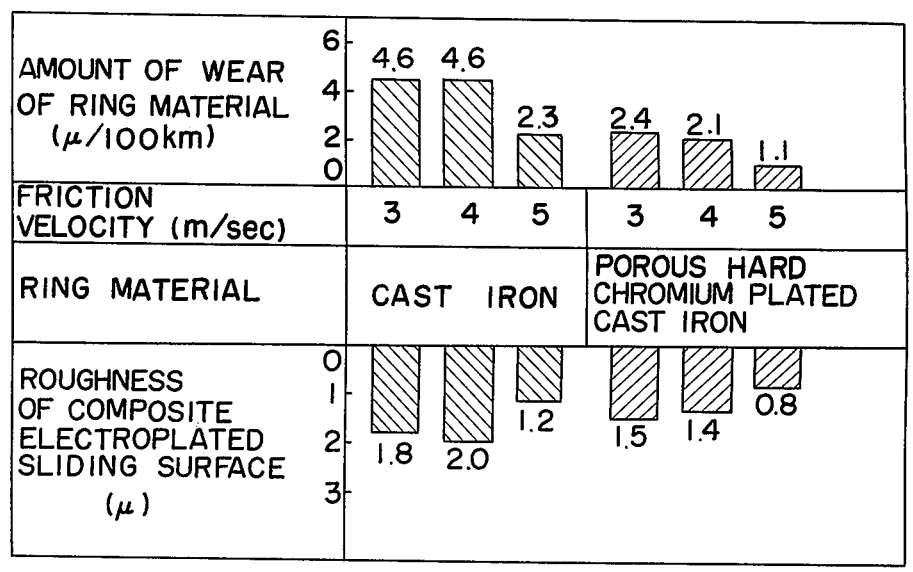
FIG. 3 is a graphical representation showing test results obtained by the wear tester illustrated in FIG. 2.

The results of the wear test were as set forth in FIG. 3, in which the wear resistance is shown in terms of variation of the roughness of the sliding surface with respect to the composite electroplated layer, and in terms of the amount of wear after a 100 km run with respect to the ring members.

EXAMPLE 2

This example illustrates the application of the invention to a water-cooled, two-cycle, two-cylinder, internal combustion engine.

A water-cooled, two-cycle, two-cylinder, internal combustion engine for an outboard motor of 64-mm bore and 61.5-mm stroke provided with composite nickel silicon-carbide electroplated inner cylinder wall surfaces and having a maximum output of 24 HP/5500 rpm, in which there were used piston rings of cast iron, hard chrome plated cast iron, and porous hard chrome plated cast iron, respectively, in separate test runs was operated continuously for 60 hours in a water tank in each test run. After the operation was stopped, the wear of the cylinder at its top dead center, the wear of the first ring, and the wear of the second ring were measured and from the results, the adaptability of the ring materials to the composite electroplated layer was judged. The results obtained by the measurement of the amounts of wear with respect to the cylinders and rings are shown in Table 3. In this test, each piston had two rings. Said first ring is an upper ring, while said second ring is a lower ring.

Table 3

| Amount of wear Ring material | Wear of Cylinder Top Dead Center ($\mu$) | | | Wear of Ring ($\mu$) | |
|---|---|---|---|---|---|
| | Maximum | Minimum | Average | 1st RING | 2nd RING |
| Cast iron | 11.5 | 3.5 | 6.1 | 50 | 40 |
| Hard chrome plated cast iron | 2.5 | 1.0 | 1.6 | 25 | 10 |
| Porous hard chrome plated cast iron | 2.0 | 0.5 | 1.2 | 11 | 6 |

EXAMPLE 3

This example illustrates the application of the invention to a air-cooled, two-cycle, one-cylinder internal combustion engine.

An air-cooled, two-cycle, one-cylinder internal combustion engine for a motorcycle of a 56-mm bore and 50-mm stroke provided with a composite nickel silicon-carbide electroplated inner cylinder wall surface and having a maximum output of 10.2 HP/7500 rpm, in which there were used piston rings of cast iron, hard chrome plated cast iron, and porous hard chrome plated cast iron, respectively, in separate test runs was test-driven over a distance of 2000 km on a sandy beach in each test run. After each test drive was completed, the wear of the cylinder at its top dead center and the increase in the piston ring gap were measured, and from the results the adaptability of the ring materials to the composite electroplated layer was judged.

The results obtained by the measurement of the average amount of wear at eight points on the top dead center of the cylinder and the increase in the first and second ring gaps are shown in Table 4.

Table 4

| Amount of wear Ring material | Average wear at 8 points on cylinder top dead center ($\mu$) | Increase in ring gap (mm) | |
|---|---|---|---|
| | | 1st RING | and RING |
| Cast iron | 2.5 | 0.30 | 0.05 |
| Hard chrome plated cast iron | 3.85 | 0.10 | 0.05 |
| Porous hard chrome plated cast iron | 2.4 | 0.05 | 0.02 |

In considering the wear of sliding metal materials, the amount of wear of not only one of the materials, but of both materials must be small. In Example 1, the roughness of the composite electroplated sliding surface was not appreciably different from the roughness measured before sliding, but the amount of wear of the porous hard chrome plated ring was approximately one half of that of the cast iron ring.

In Example 2, as can be seen from Table 3, the amounts of wear of the cylinders and rings were small when hard chrome plated cast iron was used as a ring material, and the wear of the cylinder was from 1/4 to 1/5 as compared with the wear caused when the cast iron ring was used. With respect to the first ring, which in likely to suffer a larger amount of wear, the wear of the cylinder was as low as from 1/2 to 1/5 as compared with the wear caused when the cast iron ring was used. On the other hand, the wear of the porous hard chrome plated ring was approximately one half of that of the hard chrome plated ring.

When the inner cylinder wall surface was examined after the operation was stopped, there was found a black line of from 2 to 3 mm width having a dull luster on the cylinder wall surface on which on the hard chrome plated ring had undergone sliding. This line is a mark due to contact between the nickel matrix of the composite electroplated layer and the hard chromium. There were also found on the piston ring surfaces some marks due to abrasion by the silicon carbide particles projecting outward from the composite electroplated layer. These marks occurred apparently because of interruption of lubricating oil supply since there are no oil retaining openings nor grooves on the piston ring surfaces whereby the lubricating oil was not constantly fed to the sliding surfaces. On the contrary, since the porous hard chrome plated ring has oil retentivity and good lubricity no such luster of marks due to the direct contact between the two metals were left on the inner cylinder surface.

Accordingly, it is apparent that wear resisting sliding materials can be obtained by using porous hard chrome plated rings. Also in Example 3, as can be seen from Table 4, satisfactory results could be obtained by the use of the porous hard chrome plated ring, and the ring thus plated can be used without any practical difficulty.

In summary, the advantageous features and utility which can be attained according to this invention by causing a composite electroplated material to slide relative to a porous hard chrome plated material are as follows:

1. In both materials, a very hard substance forms the first sliding surface whereby direct contact between the two metals can be avoided, and wear resistance is thereby improved by a bearing effect.

2. Since there are oil retaining spaces between the first and second sliding surfaces in both materials, lubricating oil is constantly supplied to the sliding surfaces, thereby preventing galling marks as well as wear due to abnormal abrasion.

3. The porous hard chrome plated material rapidly assumes an intimately run-in state relative to the composite electroplated material.

We claim:

1. In combination, a first member containing a surface of porous hard chromium, and a second member containing a composite electroplated surface wherein silicon carbide particles project outwardly beyond a nickel matrix, said surface of porous hard chromium and said composite electroplated surface being in sliding engagement, whereby lubricant may be retained both by said porous hard chromium and on said composite electroplated surface between said projecting silicon carbide particles.

2. The combination set forth in claim 1 wherein said surface of porous hard chromium is plated onto a first backing member, and wherein said composite electroplated surface is plated onto a second backing member.

3. The combination set forth in claim 2 in which said first backing member is a cast iron comprising 3.5 to 4.2 percent of total carbon, 2.2 to 3.4 percent of silicon, 0.5 to 1.0 percent of manganese, 0.2 percent at the most of phosphorous, 0.05 percent at the most of sulfur, and a remainder of iron and having a modulus of elasticity of the order of 17,000 kg/mm$^2$, a transverse ruption strength of at least 100 kg/mm$^2$ a hardness of 100 to 110 HrB, and a decrease in tensile strength of 7 percent at the most.

4. The combination set forth in claim 2 wherein said first backing member is a piston ring of a piston for operating cooperatively with a cylinder, the porous hard chromium surface being plated on the sliding surfaces of the piston ring, and wherein the nickel-silicon carbide composite electroplated surface is disposed on and lines the inner surface of the cylinder which comprises said second backing member.

\* \* \* \* \*